(12) United States Patent
Lawrence (10) Patent No.: US 12,248,326 B2
(45) Date of Patent: Mar. 11, 2025

(54) ROADSIDE INDUCEMENT ASSISTANCE

(71) Applicant: Cummins Inc., Columbus, IN (US)

(72) Inventor: Jason N. Lawrence, North East, PA (US)

(73) Assignee: Cummins Inc., Columbus, IN (US)

( * ) Notice: Subject to any disclaimer, the term of this patent is extended or adjusted under 35 U.S.C. 154(b) by 103 days.

(21) Appl. No.: 16/887,544

(22) Filed: May 29, 2020

(65) Prior Publication Data

US 2020/0379483 A1 Dec. 3, 2020

Related U.S. Application Data

(60) Provisional application No. 62/854,572, filed on May 30, 2019.

(51) Int. Cl.
  *G05D 1/00* (2024.01)
  *B60W 40/105* (2012.01)
  (Continued)

(52) U.S. Cl.
  CPC ......... *G05D 1/0287* (2013.01); *B60W 40/105* (2013.01); *B60W 50/04* (2013.01);
  (Continued)

(58) Field of Classification Search
  CPC . G05D 1/0287; G05D 1/0027; B60W 40/105; B60W 50/04; B60W 50/06; B60W 2510/0638; B60W 2510/0657; B60W 2510/0676; B60W 2520/10; B60W 50/0205; B60W 50/038; B60W 50/12; B60W 2050/0215; B60W 2530/18; B60W 2556/45; B60W 2756/10; F02D 31/00; F02D 2200/023; F02D 2200/024; F02D 2200/08; F02D 41/22; F02D 41/0205;
  (Continued)

(56) References Cited

U.S. PATENT DOCUMENTS 5,070,832 A * 12/1991 Hapka ..................... F02D 17/04
  123/333
6,732,031 B1 * 5/2004 Lightner ................ G06Q 50/30
  701/34.3

(Continued)

FOREIGN PATENT DOCUMENTS

KR    100962841    6/2006
WO    WO-2014/158495    10/2014

*Primary Examiner* — Aniss Chad
*Assistant Examiner* — Christopher George Fees
(74) *Attorney, Agent, or Firm* — Foley & Lardner LLP (57) ABSTRACT

A method of controlling vehicle inducement in response to an override request includes transmitting, by a controller, an override request to a remote computing device. The override request includes a fault condition resulting in a vehicle inducement that limits a performance parameter of the vehicle to a first value. The method additionally includes receiving, by the controller, instructions from the remote computing device in response to the override request. The instructions include an inducement calibration including a second value of the performance parameter. The method further includes controlling, by the controller, the vehicle inducement to limit the performance parameter of the vehicle to the second value.

17 Claims, 4 Drawing Sheets

(51) Int. Cl.
  *B60W 50/04* (2006.01)
  *B60W 50/06* (2006.01)
  *F02D 31/00* (2006.01)

(52) U.S. Cl.
  CPC ............ *B60W 50/06* (2013.01); *F02D 31/00* (2013.01); *G05D 1/0027* (2013.01); *B60W 2510/0638* (2013.01); *B60W 2510/0657* (2013.01); *B60W 2510/0676* (2013.01); *B60W 2520/10* (2013.01); *F02D 2200/023* (2013.01); *F02D 2200/024* (2013.01); *F02D 2200/08* (2013.01)

(58) Field of Classification Search
  CPC ........... F02D 41/2493; F02D 2041/227; F02D 2250/26; F02D 41/2429; G07C 5/008; G07C 5/0816
  See application file for complete search history.

(56) References Cited

U.S. PATENT DOCUMENTS

| | | | |
|---|---|---|---|
| 7,992,377 B2 | 8/2011 | Brown | |
| 8,116,961 B2 | 2/2012 | Bogema et al. | |
| 8,944,033 B2 | 2/2015 | Coldren et al. | |
| 9,520,006 B1* | 12/2016 | Sankovsky | G06Q 10/20 |
| 9,626,812 B2* | 4/2017 | See | F01N 3/208 |
| 10,023,114 B2* | 7/2018 | Adams | G07C 5/008 |
| 10,395,444 B1* | 8/2019 | Edren | G07C 5/0808 |
| 2008/0162022 A1* | 7/2008 | Groer | F02D 41/22 60/285 |
| 2008/0162024 A1* | 7/2008 | Groer | F02D 41/22 701/115 |
| 2010/0312445 A1* | 12/2010 | Bogema | F02D 41/0275 701/70 |
| 2014/0067231 A1* | 3/2014 | Mosher | F02D 41/22 701/102 |
| 2014/0277995 A1* | 9/2014 | Slaton | B60W 50/029 701/1 |
| 2014/0318104 A1* | 10/2014 | Johnson | F01N 3/18 60/274 |
| 2015/0088362 A1* | 3/2015 | See | F01N 11/00 701/33.9 |
| 2018/0068497 A1* | 3/2018 | Kurtz | G07C 5/0808 |
| 2018/0144388 A1* | 5/2018 | Mattern | G06Q 30/0631 |
| 2019/0066406 A1* | 2/2019 | Sarwar | G07C 5/085 |
| 2019/0162154 A1* | 5/2019 | Pompea | B60W 20/16 |
| 2019/0197798 A1* | 6/2019 | Abari | G05D 1/0088 |
| 2019/0279447 A1* | 9/2019 | Ricci | G06F 3/017 |
| 2019/0311558 A1* | 10/2019 | Bika | G07C 5/0841 |
| 2020/0331487 A1* | 10/2020 | Darrah, Jr. | B60K 35/00 |

\* cited by examiner

ROADSIDE INDUCEMENT ASSISTANCE

CROSS-REFERENCE TO RELATED PATENT APPLICATIONS

The present application claims the benefit of and priority to U.S. Provisional Patent Application No. 62/854,572, entitled "Roadside Inducement Assistance" and filed May 30, 2019, the entire disclosure of which is hereby incorporated by reference herein.

TECHNICAL FIELD

The present disclosure relates generally to vehicle inducement. More specifically, the present disclosure relates to control methods and systems to improve roadside support for issues resulting in vehicle inducement.

BACKGROUND

Existing regulations require certain systems for both on- and off-highway vehicles to be continuously monitored. These systems may include emissions control systems and/or other critical vehicle subsystems. In the event that a fault is detected, regulations require that the vehicle automatically de-rate engine performance to prevent damage to the vehicle and/or possible non-compliance with emissions standards. Once the de-rate has been triggered, the vehicle will progress through a series of actions to limit engine operation. Ultimately, the vehicle may activate a speed limiter to prevent further vehicle operation. In order to correct the fault associated with the vehicle inducement (e.g., de-rated vehicle performance), the vehicle may need to be towed to a service center (e.g., a dealer or distributor) to repair the system. This can result in significant cost and vehicle downtime.

It would be advantageous to provide a vehicle roadside support system that addresses this and other concerns.

SUMMARY

One embodiment relates to a method of controlling vehicle inducement in response to an override request. The method includes transmitting, by a controller, an override request to a remote computing device. The override request includes a fault condition resulting in a vehicle inducement that limits a performance parameter of the vehicle to a first value. The method additionally includes receiving, by the controller, instructions from the remote computing device in response to the override request. The instructions include an inducement calibration including a second value of the performance parameter. The method further includes controlling, by the controller, the vehicle inducement to limit the performance parameter of the vehicle to the second value.

Another embodiment relates to a system. The system includes an inducement control circuit and a vehicle performance limiter coupled to the inducement control circuit. The vehicle performance limiter is structured to limit a performance parameter of the vehicle. The inducement control circuit is structured to control the vehicle performance limiter based on instructions from a remote computing device that are generated in response to an override request. The override request includes a fault condition for the vehicle.

Another embodiment relates to an apparatus. The apparatus includes an inducement control circuit including a memory storing machine readable instructions and a processor. The machine readable instructions are structured to cause the processor to perform operations including (i) transmitting an override request including a fault condition to a remote computing device, where the fault condition results in a vehicle inducement that limits a performance parameter of a vehicle to a first value; (ii) receiving instructions from the remote computing device in response to the override request, where the instructions include an inducement calibration that includes a second value of the performance parameter; and (iii) controlling the vehicle inducement to limit the performance parameter of the vehicle to the second value.

These and other features, together with the organization and manner of operation thereof, will become apparent from the following detailed description when taken in conjunction with the accompanying drawings.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for roadside support of vehicle inducement events. The various concepts introduced above and discussed in greater detail below may be implemented in any number of ways, as the concepts described are not limited to any particular manner of implementation. Examples of specific implementations and applications are provided primarily for illustrative purposes.

Referring generally to the figures, the various embodiments disclosed herein relate to systems, apparatuses, and methods for requesting roadside assistance and controlling vehicle inducement events in response to the request.

On and off-highway vehicles equipped with diesel engines include emissions control systems to reduce the amount of pollutants exhausted from the diesel engine. These emissions control systems may employ various methods to reduce exhausted pollutants; for example, an emissions control system may use selective catalytic reduction (SCR) techniques to minimize the amount of nitrogen oxides (NOx) exhausted into the environment surrounding the vehicle. The SCR system may require a consumable fluid such as diesel exhaust fluid or urea, which needs to be replenished periodically to maintain the functionality of the SCR system. In the event that the fluid is not replenished, a vehicle inducement will be activated (e.g., enabled, etc.) in which the vehicle will begin to automatically de-rate engine performance to limit vehicle operations. The vehicle inducement may differ between vehicles intended for on-highway use and off-highway use. For example, vehicle inducement for an on-highway vehicle may include limiting a maximum road speed of the vehicle. For an off-highway vehicle, vehicle inducement may include limiting a maximum engine rotational speed (e.g., preventing operation above idle) or preventing further engine operation entirely by shutting down the engine. In some embodiments, the vehicle inducement may be implemented in stages. Ultimately, a final vehicle inducement stage will be triggered that limits the maximum operating speed of the vehicle and prevents an operator from driving the vehicle.

The method, according to various illustrative embodiments disclosed herein, includes transmitting (e.g., via telematics) an override request including a fault condition to a fleet manager, an inducement assistance service (e.g., a dealership, a vehicle or engine manufacturer, etc.), or another remote computing device. The vehicle may be an on-highway or an off-highway diesel truck. The fault condition may be indicative of increased exhaust emissions from the diesel engine; for example, due to a failure to refill a fluid tank (e.g., a diesel exhaust fluid, a urea solution, etc.) used as part of an emissions control system for the vehicle. Alternatively, the fault condition may be indicative of an engine operating parameter (e.g., oil pressure, oil temperature, etc.) that is outside of an allowable range. In yet other embodiments, the fault conditions may result from sensor data indicating that an operator or another user has tampered with the vehicle.

The method includes receiving instructions including an inducement calibration from the fleet manager in response to the override request. The inducement calibration adjusts vehicle inducement parameters (e.g., a maximum vehicle operating speed, a maximum torque output from the engine, a lock that prevents engine operation above idle (e.g., an speed lock), a lock that prevents engine operation (e.g., an operational lock), etc.), in order to enable an operator to drive the vehicle to a dealership or another service center. Among other benefits, modifying vehicle inducement parameters significantly reduces the risk of operator injury as compared to existing vehicle inducement approaches (e.g., as compared to stranding an operator of the vehicle along the side of the road). The method also eliminates the need for a separate tow truck and the associated greenhouse gas emissions associated with tow truck operation to move the vehicle to a dealership or service center.

According to various illustrative embodiments, the inducement calibration includes a mileage limit that prevents an operator from continuously driving the vehicle when the fault condition is present. In some embodiments, the mileage limit is determined based on a real-time distance of the vehicle from a nearest service center (e.g., dealership, filling station, etc.), which can, advantageously, minimize a duration of vehicle operation when the fault condition is present. The vehicle controller may also include download counter logic (e.g., a download counter) to prevent an operator from requesting repeated calibrations or a number of calibrations exceeding a threshold value. These and other advantageous features with become apparent to those reviewing the present disclosure.

Figure 1:
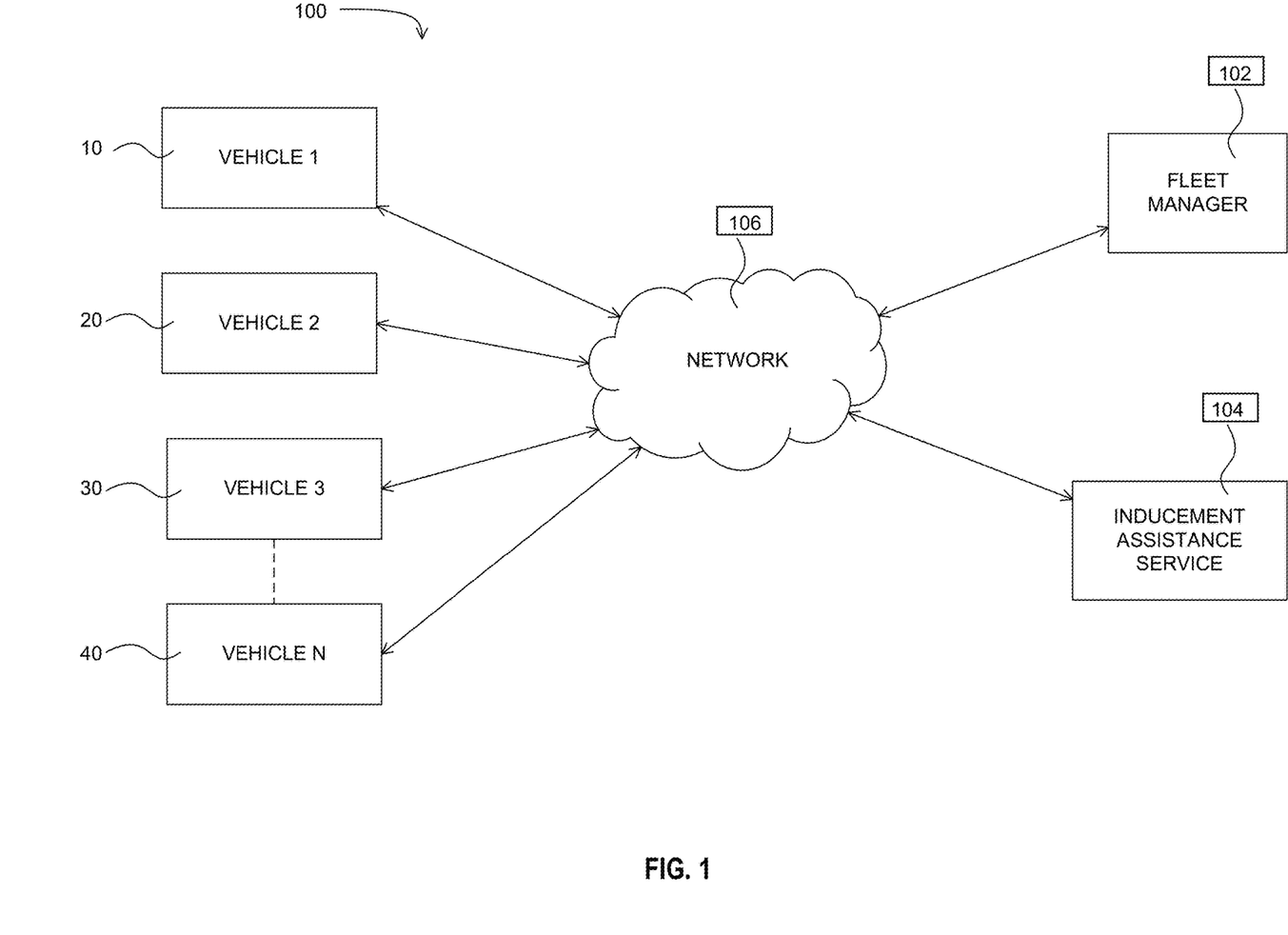
FIG. 1 is a block diagram of a vehicle roadside support system, according to an illustrative embodiment.

FIG. 1 depicts a block diagram of a vehicle roadside support system, shown as system 100. In alternative embodiments, the system 100 may include additional, fewer, and/or different components. The system 100 includes a plurality of vehicles 10, 20, 30, 40. In alternative embodiments, the system 100 includes one vehicle 10. According to various illustrative embodiments, the vehicles 10, 20, 30, 40 are commercial on-road vehicles such as semi-trucks or the like. Alternatively, or in combination, the vehicles 10, 20, 30, 40 may include medium or light duty vehicles (e.g., a school bus, a pickup truck, etc.) configured for on-road use. Each one of the vehicles 10, 20, 30, 40 includes a prime mover structured to power the vehicle such as an internal combustion engine. The engine may be a diesel internal combustion engine that uses diesel fuel to drive the combustion process. Alternatively, the engine may be a bi-fuel internal combustion engine system, a gasoline internal combustion engine system, a liquid natural gas internal combustion engine system, a compressed natural gas internal combustion engine system, a biofuel internal combustion engine system, an ethanol internal combustion engine system, or another internal combustion engine system using a different type of fuel source.

As shown in FIG. 1, the system 100 additionally includes a plurality of remote computing devices, shown as fleet manager 102 and inducement assistance service 104. The fleet manager 102 may be a vehicle location tracking and maintenance service. The fleet manager 102 may be structured to receive vehicle diagnostic information (e.g., fault conditions, etc.) and/or locational information regarding the vehicle 10, 20, 30, 40. The fleet manager 102 may also be structured to receive identification information for the vehicles 10, 20, 30, 40 such as a vehicle electronic serial number (ESN), registration information, a vehicle identification number (VIN), or another form of vehicle identification information. The fleet manager 102 may be structured to view and approve inducement calibration requests received from a controller of the vehicle 10, 20, 30, 40 or an operator of the vehicle 10, 20, 30, 40 (e.g., via telematics, a mobile phone, the internet, etc.). The fleet manager 102 may additionally be structured to compare the location of the vehicle 10, 20, 30, 40 with a nearest service center (e.g., dealership, distribution center, filling station, etc.) in order to determine how far the vehicle 10, 20, 30, 40 must travel to correct a fault condition.

The inducement assistance service 104 may include the same or similar functionality as the fleet manager 102. Additionally, the inducement assistance service 104 may be structured to transmit inducement calibrations to at least one of the plurality of vehicles 10, 20, 30, 40. In various illustrative embodiments, the inducement assistance service 104 may be provided by a dealership or an original equipment manufacturer (e.g., a manufacturer of the internal combustion engine, etc.).

In the illustrative embodiment of FIG. 1, each of the vehicles 10, 20, 30, 40 is communicatively coupled to the fleet manager 102 and the inducement assistance service 104 through a network 106. The network 106 may include a wide area network (WAN), a telematics network such as a telecommunications network, a public switched telephone network (PSTN), the Internet, and/or any other type of communication network known to those of skill in the art. The vehicles 10, 20, 30, 40 may be structured to transmit and/or receive information from fleet manager 102 and the inducement assistance service 104 through the network 106. Moreover, the fleet manager 102 may be able to transmit and/or receive information from the inducement assistance service 104 through the network 106.

Figure 2:
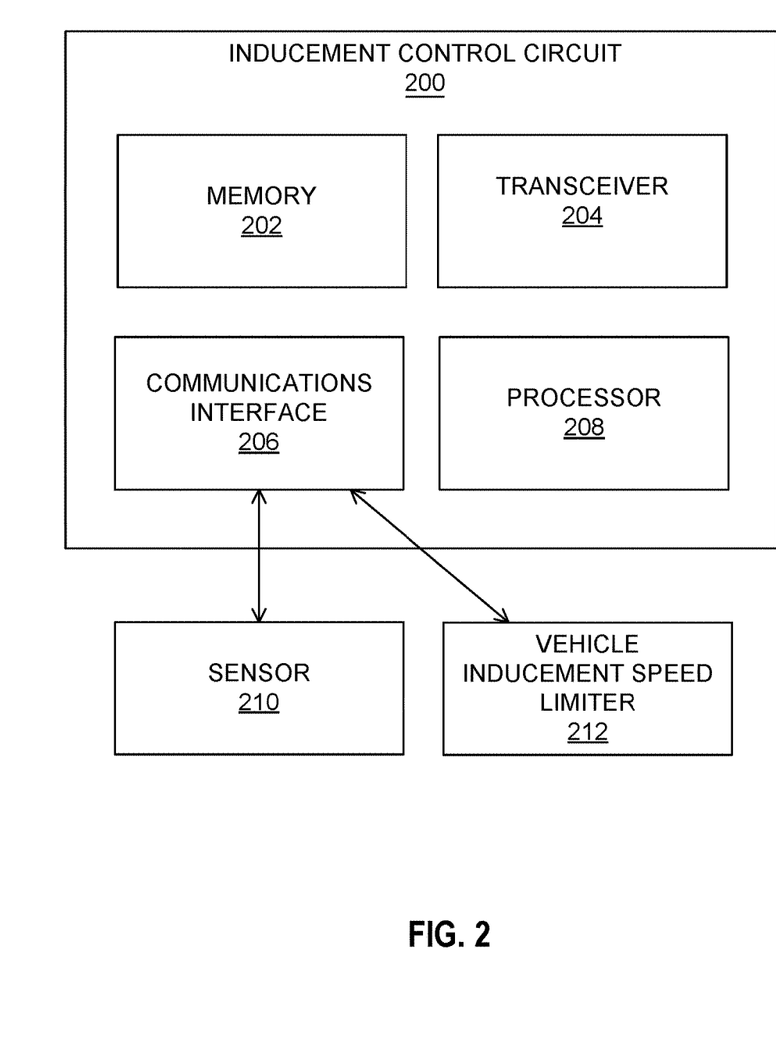
FIG. 2 is a block diagram of an engine control system including an inducement control unit and an inducement vehicle speed limiter, according to an illustrative embodiment.

FIG. 2 shows a block diagram of an inducement control circuit 200 for one of the vehicles 10. The inducement control circuit 200 includes memory 202, a transceiver 204, a communications interface 206, and a processor 208. In alternative embodiments, the inducement control circuit 200 may include additional, fewer, and/or different components. Memory 202 may be structured to store machine readable instructions for the inducement control circuit 200. The machine readable instructions may include instructions to monitor and store sensor data from one or more sensors 210 on the vehicle 10. Additionally, the machine readable instructions may include instructions to determine a fault condition (e.g., a condition requiring vehicle inducement, a condition indicative of a failure of an emissions system of the vehicle 10, etc.) based on the sensor data.

In some embodiments, memory 202 is structured to store vehicle inducement parameters (e.g., vehicle de-rating parameters, performance parameters, etc.) corresponding to one or more fault conditions. For example, memory 202 may be structured to store a maximum allowable operating speed of the vehicle 10 (e.g., a limited speed), a maximum output torque for the engine, or another suitable vehicle inducement parameter. Additionally, memory 202 may be structured to store vehicle identification and/or location information. The vehicle identification information may include an electronic serial number (ESN) associated with the vehicle 10, a vehicle registration number, a vehicle license number, a vehicle identification number (VIN), or the like. The location information may include global positioning system (GPS) coordinates for the vehicle 10, a mile marker and highway number, or the like.

The transceiver 204 may include a transmitter for transmitting information and/or a receiver for receiving information. As an example, the transceiver 204 of the inducement control circuit 200 may be structured to transmit sensor data from the one or more sensors 210 on the vehicle 10, fault conditions determined by the inducement control circuit 200, and vehicle location and/or identification information to the remote computing device (e.g., to the fleet manager 102 and/or the inducement assistance service 104). The transceiver 204 may also be structured to receive instructions from the remote computing device. For example, the transceiver 204 may be structured to receive inducement calibrations that cause the inducement control circuit 200 to modify one or more vehicle inducement parameters such as a maximum operating speed of the vehicle, a maximum torque provided by the engine, a maximum engine rotational speed, a lock that prevents engine operation, or the like.

The communications interface 206 is structured to interface the inducement control circuit 200 with other vehicle components. As shown in FIG. 2, the communications interface 206 is operably coupled to a plurality of vehicle sensors and controls for the vehicle 10 and structured to transmit and/or receive data from the sensors and controls. In the illustrative embodiment of FIG. 2, the communications interface 206 is operably coupled to the sensor 210 and a vehicle performance limiter, shown as vehicle inducement speed limiter 212. The communications interface 206 is structured to receive sensor data from the sensor 210 (e.g., a control signal from the sensor 210 indicative of a fault condition, etc.). The sensor 210 may include a liquid level sensor structured to determine a level of fluid for an emissions reduction system of the vehicle 10, a temperature sensor structured to determine an engine oil temperature, a pressure sensor structured to determine an engine oil pressure, or another engine and/or vehicle sensor. In various illustrative embodiments, the sensor 210 is one of a plurality of sensors that are operably coupled to the communications interface 206.

The vehicle inducement speed limiter 212 is structured to control a maximum road speed (e.g., driving speed) of the vehicle 10. The vehicle inducement speed limiter 212 may be operably coupled to a throttle positioning system, fuel system, and/or another vehicle subsystem. The vehicle inducement speed limiter 212 controls these various vehicle subsystems to limit the maximum road speed of the vehicle 10. By way of example, the vehicle inducement speed limiter 212 may be structured to limit a maximum throttle position signal delivered to the engine (by the throttle positioning system) when a fault condition is detected, and thereby prevent an operator of the vehicle 10 from damaging the vehicle or circumventing emissions regulations. In other embodiments, the vehicle inducement speed limiter 212 may be structured to control a maximum engine rotational speed (e.g., revolutions per minute, etc.) or to shut down the engine.

In some embodiments, the communications interface 206 is operably coupled to a different vehicle performance limiter or a combination of limiters for the vehicle 10. For example, the communications interface 206 may be operably coupled to a torque limiter structured to de-rate engine torque in response to a fault condition (e.g., independently from road speed, etc.).

The communications interface 206 may include any type and any number of wired or wireless connections. For example, a wired connection may include a serial cable, a fiber optic cable, a CAT5 cable, or any other form of wired connection. Wireless connections may include the Internet, Wi-Fi®, cellular, radio, Bluetooth®, ZigBee®, etc. In one embodiment, the inducement control circuit 200 forms part of a controller area network (CAN) bus for the vehicle 10 that provides the exchange of signals, information, and/or data between vehicle components. The CAN bus includes any number of wired and wireless connections.

The processor 208 may be operably coupled to each of the components of the inducement control circuit 200 and may be structured to control interaction between the components. For example, the processor 208 may be structured to control the collection, processing, and transmission of sensor data for the inducement control circuit 200. Additionally, the processor 208 may be structured to retrieve and interpret vehicle inducement parameters stored in memory 202. The processor 208 may further be structured to interpret inducement calibrations received from the remote computing device (e.g., the fleet manager 102 and/or the inducement assistance service 104 as shown in FIG. 1). For example, the processor 208 may be structured to control the vehicle inducement speed limiter 212 or another limiter or another vehicle controller in response to instructions from the remote computing device.

The inducement control circuit 200 is structured to monitor and control vehicle inducement parameters in response to a fault condition and instructions from the remote computing device. The vehicle inducement parameters may include limits to engine performance or another vehicle operating parameter (e.g., a maximum operating speed of the vehicle 10, a maximum output torque for the engine, a maximum engine rotational speed, or another suitable vehicle operating parameter).

Figure 3:
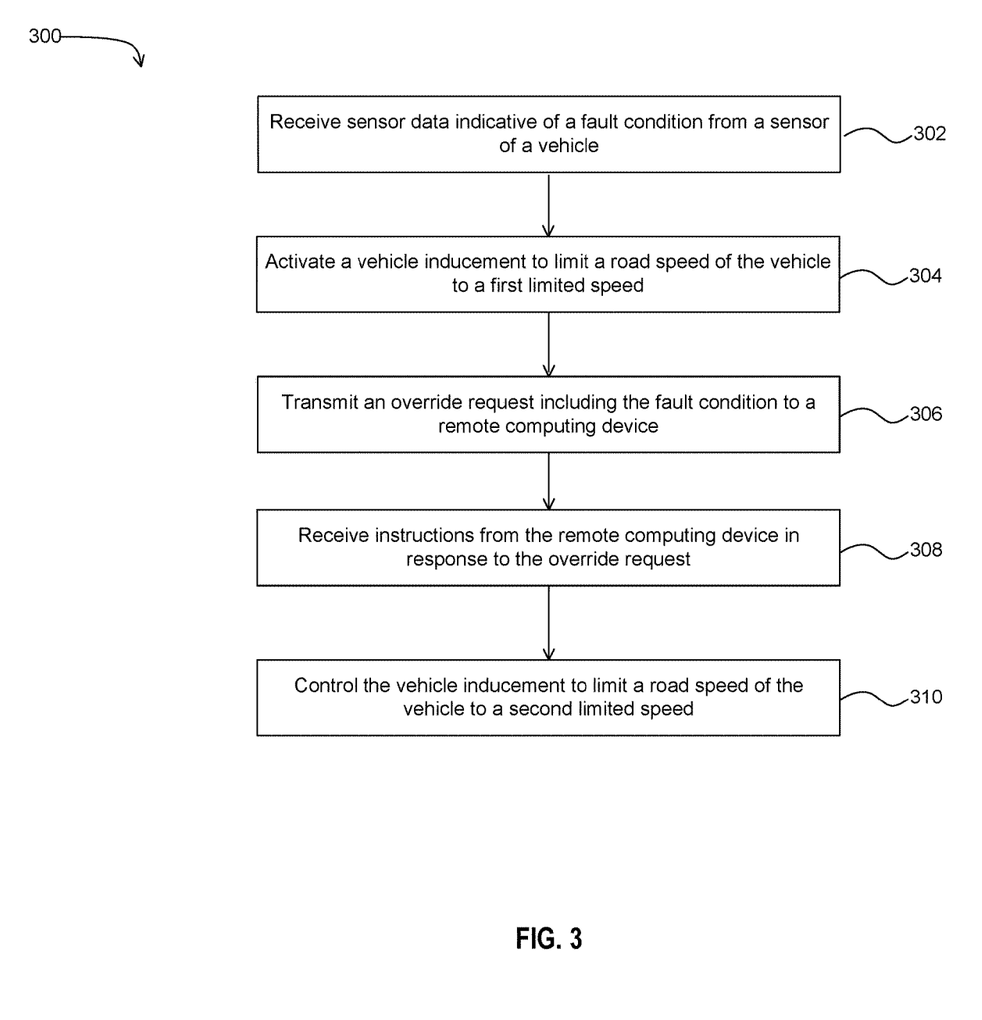
FIG. 3 is a block diagram of a method of requesting an inducement calibration in response to a vehicle inducement, according to an illustrative embodiment.

FIG. 3 shows a method 300 of requesting an inducement calibration in response to a vehicle inducement that modifies a maximum vehicle operating speed (e.g., road speed). In other embodiments, the method 300 may modify any other vehicle operating parameter (e.g., a maximum operating speed of the vehicle 10, a maximum output torque for the engine, a maximum engine rotational speed, an engine operating state, or any other suitable vehicle parameter). At 302, sensor data indicative of a fault condition is received by an inducement control circuit of a vehicle. The vehicle and the inducement control circuit may be the same or similar to the vehicle 10 of FIG. 1 and the inducement control circuit 200 of FIG. 2, respectively. The sensor data may be received from one or more vehicle sensors 210 onboard the vehicle 10. Block 302 may include receiving a control signal from the sensor 210 indicative of an engine or vehicle 10 operating parameter being outside of an allowable range. For example, in an embodiment where the sensor 210 is an engine oil pressure sensor, block 304 may include receiving a control signal from the sensor 210 indicative of an oil pressure that exceeds a threshold oil pressure over a given time interval. In an embodiment where the sensor 210 is a liquid level sensor for an emissions control system, block 304 may include receiving a control signal from the sensor 210 indicative of a level of fluid (e.g., a level of fluid in a bulk storage tank on the vehicle 10, etc.) being below a given threshold level. Block 304 may include continuously receiving and interpreting the control signal of the vehicle sensor(s) 210 in real-time (e.g., querying the control signal at a first sampling rate, conditioning the control signal using signal conditioning circuitry onboard one of the control circuit 200 or the sensor 210, and converting the conditioned control signal to digital values using for example an analog-to-digital converter onboard one of the control circuit 200 or the sensor 210, etc.).

At 304, the inducement control circuit 200 activates (e.g., enables, etc.) a vehicle inducement to limit a performance parameter of the vehicle such as the road speed of the vehicle 10 to a first value or first limited speed (e.g., 5 mph or another suitable road speed to effectively prevent the operator from driving the vehicle 10). Block 304 may include controlling the vehicle inducement speed limiter 212 of the inducement control circuit 200 to prevent the operator from exceeding the first limited speed (e.g., by limiting a maximum throttle position signal to the engine, by limiting the amount of fuel provided to the engine, etc.). At 306, an override request including the fault condition is transmitted from the vehicle 10 to a remote computing device. The override request may be communicated manually (e.g., via telematics, a mobile phone, the internet, etc.) by an operator of the vehicle 10 to the remote computing device and/or by the inducement control circuit 200 in response to an operator's commands.

In some embodiments, block 306 may include communicating the override request to the fleet manager 102 to obtain approval for the request and, once approval has been received, submitting the approved request to the inducement assistance service 104. Block 306 may additionally include retrieving, by the processor 208, the fault condition and/or another form of diagnostic data (e.g., sensor data) stored in memory 202 for transmission to the remote computing device. Block 306 may further include transmitting identification and/or location information for the vehicle 10 to the remote computing device. For example, block 306 may include transmitting the vehicle's ESN, VIN, or another type of vehicle identification to the remote computing device. Alternatively, or in combination, block 306 may include transmitting global positioning system (GPS) coordinates for the vehicle 10, a mile marker location and highway number at which the vehicle 10 is stranded, or the like.

In some embodiments, method 300 may further include generating an inducement calibration based on one, or a combination of the fault condition, the vehicle identification information, and the location of the vehicle. For example, the method 300 may include determining a real-time distance of the vehicle 10 from a nearest service center (e.g., a dealership, a filling station, etc.) based on a location of the vehicle 10. The real-time distance between the vehicle 10 and the nearest service center may be determined using a mapping service in combination with the vehicle's GPS coordinates. The method 300 may include determining a mileage limit for the inducement calibration based on the real-time distance between the vehicle 10 and the nearest service center. In other embodiments, the mileage limit may be a fixed value (e.g., 200 miles). In yet other embodiment, the mileage limit may be determined based on the type of fault condition reported to the remote computing device (e.g., the issues resulting in the fault condition).

In another example, the method 300 includes determining a severity characteristic associated with the fault condition. The severity characteristic may be indicative of whether the vehicle 10 is safe to operate over a given distance (e.g., whether the fault condition is caused by a faulty sensor, tampering, or a condition which could result in permanent damage to the engine and/or other vehicle subsystems). The method 300 may additionally include selecting the inducement parameters for the inducement calibration and/or denying the inducement calibration based on the severity characteristic.

At 308, instructions are received by the inducement control circuit 200 from the remote computing device in response to the override request. Block 308 may additionally include storing the instructions and any inducement parameters associated with the instructions in memory 202. The instructions may include an inducement calibration that modifies the vehicle inducement parameters in order to enable the vehicle 10 to drive a given distance without exceeding a given maximum speed. In various illustrative embodiments, the given maximum speed is a second value of the performance parameter such as a second limited speed (e.g., 55 mph, etc.) that is greater than the first limited speed. The inducement calibration may also include a mileage limit or threshold, which, once exceeded, results in the inducement control circuit 200 controlling the vehicle inducement to limit the road speed of the vehicle 10 to the first limited speed. Among other benefits, utilizing a mileage limit or other duration tracking feature prevents the operator from driving the vehicle 10 indefinitely. The details of implementing the inducement calibration will be described in detail with reference to FIG. 4.

At 310, the vehicle inducement is controlled, in response to the inducement calibration, to limit a road speed of the vehicle 10 to the second limited speed. Block 310 may include controlling the vehicle inducement speed limiter 212 to prevent the operator from exceeding the second limited speed (e.g., by limiting a maximum throttle position signal, by limiting the amount of fuel provided to the engine, etc.). It will be appreciated that the methods and systems disclosed herein may also be applied by the inducement control circuit 200 to control other inducement parameters. For example, method 300 may include controlling a torque limiter to temporarily improve engine performance (e.g., to increase a maximum operating torque provided by the engine) or another inducement parameter.

Figure 4:
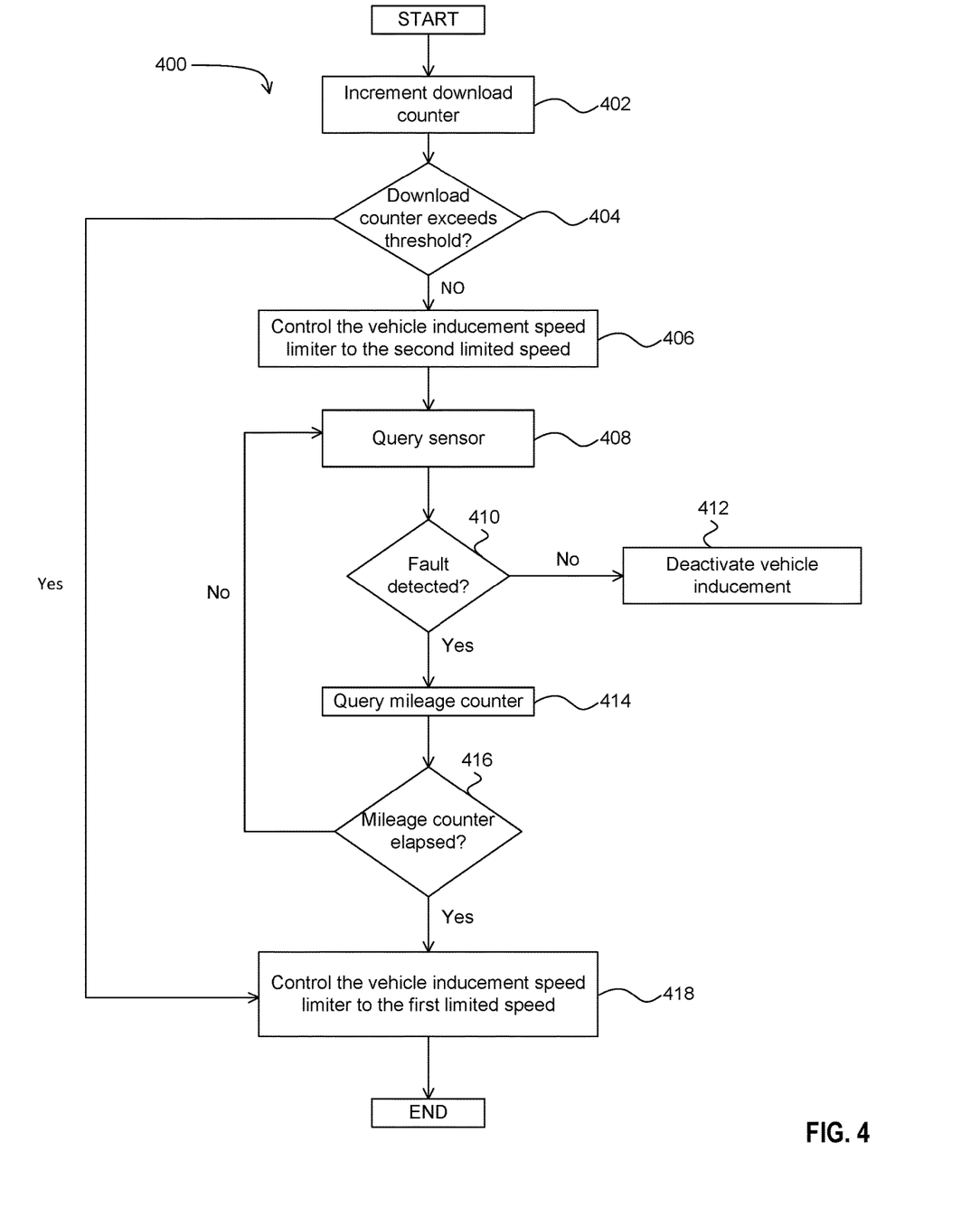
FIG. 4 is a block diagram of a method of implementing an inducement calibration, according to an illustrative embodiment.

FIG. 4 shows a method 400 of controlling vehicle inducement based on instructions received from the remote computing device (e.g., based on the inducement calibration). In alternative embodiments, the method 400 may include additional, fewer, and/or different operations. Method 400 may be implemented by an inducement control circuit on a vehicle, such as the inducement control circuit 200 described with reference to FIG. 2. At 402, a download counter is incremented. The download counter may be indicative of a number of separate inducement calibrations received by the inducement control circuit 200 since the fault condition occurred. Block 402 may include incrementing the download counter by an integer value after the instructions are received from the remote computing device.

The inducement control circuit 200 may be structured to utilize the download counter to prevent an operator from repeatedly circumventing vehicle inducement. At 404, the inducement control circuit 200 determines whether the download counter exceeds a threshold number of downloads (a threshold number of downloads associated with the inducement calibration). Block 404 may include accessing a threshold number of downloads stored in memory 202. Block 404 additionally includes comparing the download counter to the threshold number of downloads. In the event that the download counter exceeds the threshold number of downloads, the method 400 proceeds to 418. At 418, the inducement control circuit 200 controls the vehicle inducement speed limiter 212 to limit the road speed of the vehicle 10 to the first limited speed in order to prevent further vehicle operation. In the event that the download counter is below the threshold number of downloads, the method 400 proceeds to 406. At 406, the inducement control circuit 200 controls the vehicle inducement speed limiter 212 to limit the road speed of the vehicle 10 to the second limited speed, thereby allowing the operator to drive the vehicle 10 to the nearest service center for repair.

The method 400 includes continuously monitoring vehicle 10 operations in order to prevent the operator from driving the vehicle 10 indefinitely after an inducement calibration has been applied. At 408, the inducement control circuit 200 queries the sensor 210 to determine whether the fault condition has been corrected (e.g., to determine if the vehicle 10 has been serviced, to determine that a fluid for the emissions system has been replenished, etc.). At 412, the vehicle inducement is deactivated (e.g., disabled, etc.) based on a determination that the fault condition has been corrected (410). Block 412 may include deactivating the vehicle inducement speed limiter 212 to return the vehicle 10 to its full operational capabilities. In the event the fault condition still exists, the method 400 proceeds to 414. At 414, a mileage counter is queried to determine whether the mileage counter has elapsed (416) (e.g., that the vehicle 10 has exceeded the mileage limit associated with the inducement calibration). In other embodiments, the method 400 may include querying another counter or timer indicative of vehicle's operating duration (e.g., an inducement timer indicative of a time since the most recent calibration download was received, etc.). The method 400 continues to repeat blocks 408-416 until the mileage counter has elapsed. Once the mileage counter has elapsed, the method 400 proceeds to 418, where the original vehicle inducement parameters are reinstated to prevent further vehicle 10 operation.

No claim element herein is to be construed under the provisions of 35 U.S.C. § 112(f), unless the element is expressly recited using the phrase "means for."

For the purpose of this disclosure, the term "coupled" means the connecting, joining, or linking of two members directly or indirectly to one another. Such joining may be achieved with the two members or the two members and any additional intermediate members. For example, component A "coupled" to component B may signify that component A is connected directly to component B (i.e., no intermediary) or indirectly connected to component B (e.g., through one or more intermediaries).

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the present disclosure may provide a specific order and composition of method steps, the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
receiving, by a controller, a first set of sensor data regarding a fault condition;
receiving, by the controller, location information of a vehicle;
transmitting, by the controller, an override request comprising the fault condition to a remote computing device, the fault condition resulting in automatically enabling a vehicle inducement that limits a performance parameter of the vehicle to a first value based on the fault condition;
receiving, by the controller, instructions from the remote computing device in response to the override request, the instructions comprising an inducement calibration, the inducement calibration structured to modify the vehicle inducement, the inducement calibration including a duration limit, the duration limit including a distance limit and a time limit, wherein the duration limit is based on a type of the fault condition and the distance limit is based on the location information;
receiving, by the controller, a second set of sensor data regarding the fault condition responsive to receiving the instructions from the remote computing system;
responsive to determining that the fault condition has been resolved based on the second set of sensor data regarding the fault condition and subsequent to receiving the inducement calibration, deactivating, by the controller, the vehicle inducement; and
responsive to determining that the fault condition remains present based on the second set of sensor data regarding the fault condition and subsequent to receiving the inducement calibration:
determining, by the controller, a second value of the performance parameter, wherein the second value of the performance parameter is greater than the first value based on a severity characteristic of the fault condition being at or below a severity threshold and based on the inducement calibration, and wherein the second value of the performance parameter is equal to the first value based on the severity characteristic of the fault condition being greater than the severity threshold such that the inducement calibration is denied;
controlling, by the controller, the vehicle inducement to limit the performance parameter of the vehicle to the second value based on the severity characteristic of the fault condition being at or below the severity threshold and while a distance value of the vehicle is less than the distance limit and an amount of time since receiving the inducement calibration is less than the time limit; and
subsequent to controlling the vehicle inducement based on the inducement calibration to limit the performance parameter of the vehicle to the second value, controlling, by the controller, the vehicle inducement to limit the performance parameter of the vehicle to the first value responsive to the distance value of the vehicle being at or above the distance limit and the amount of time since receiving the inducement calibration being at or above the time limit.

2. The method of claim 1, wherein the second value and the first value are indicative of a speed of at least one of the vehicle or a prime mover of the vehicle.

3. The method of claim 1, wherein the performance parameter of the vehicle is one of a road speed, an output torque for a prime mover of the vehicle, a rotational speed of the prime mover, an operational lock that prevents engine operation, or a speed lock that prevents engine operation above a speed at idle.

4. The method of claim 1, further comprising determining the fault condition based on the first set of sensor data from a sensor onboard the vehicle.

5. The method of claim 4, wherein the sensor is one of a liquid level sensor structured to determine a level of fluid for an emissions control system of the vehicle, a temperature sensor structured to determine an engine oil temperature, or a pressure sensor structured to determine an engine oil pressure.

6. The method of claim 1, further comprising:
updating, by the controller, a download counter indicative of a number of inducement calibrations received by the controller since the fault condition was first detected; and
controlling, by the controller, the vehicle inducement to limit the performance parameter of the vehicle to the first value based on a determination that the download counter exceeds a threshold number of downloads.

7. The method of claim 1, wherein the remote computing device comprises a fleet manager and an inducement assistance service, the method further comprising:
receiving an approval for the override request from the fleet manager; and
transmitting the override request to the inducement assistance service in response to the approval, wherein the inducement calibration is received from the inducement assistance service.

8. The method of claim 1, wherein the second value and the first value are indicative of an output torque of at least one of the vehicle or a prime mover of the vehicle.

9. A system, comprising:
an inducement control circuit; and
a vehicle performance limiter coupled to the inducement control circuit, the vehicle performance limiter structured to limit a performance parameter of a vehicle to a first value of the performance parameter based on a fault condition, the inducement control circuit structured to:
receive a first set of sensor data regarding the fault condition;
receive location information of a vehicle;
determine an inducement calibration structured to modify the performance parameter based on the fault condition, the inducement calibration including a duration limit, the duration limit including a distance limit and a time limit, wherein the duration limit is based on a type of the fault condition, and the distance limit is based on the location information;
receive a second set of sensor data regarding the fault condition;
responsive to determining that the fault condition remains present based on the second set of sensor data regarding the fault condition and subsequent to receiving the inducement calibration:
determine a second value of the performance parameter, wherein the second value of the performance parameter is greater than the first value based on a severity characteristic of the fault condition being at or below a severity threshold and based on an inducement calibration received from a remote computing device that is structured to modify the performance parameter, and wherein the second value of the performance parameter is equal to the first value based on the severity characteristic of the fault condition being greater than the severity threshold such that the inducement calibration is denied;

control the vehicle performance limiter to the second value of the performance parameter based on the severity characteristic of the fault condition being at or below the severity threshold and while a distance value of the vehicle is less than the distance limit and an amount of time since receiving the inducement calibration is less than the time limit; and subsequent to controlling the vehicle inducement based on the inducement calibration to limit the performance parameter of the vehicle to the second value, control the vehicle inducement to limit the performance parameter of the vehicle to the first value responsive to the distance value of the vehicle being at or above the distance limit and the amount of time since receiving the inducement calibration being at or above the time limit; and responsive to determining that the fault condition has been resolved based on the second set of sensor data regarding the fault condition and subsequent to receiving the inducement calibration, deactivate the vehicle inducement.

10. The system of claim 9, wherein the vehicle performance limiter is a vehicle inducement speed limiter structured to limit a road speed of the vehicle, wherein the vehicle inducement speed limiter is operably coupled to one of a throttle positioning system of the vehicle or a fuel system of the vehicle, and wherein the vehicle inducement speed limiter is structured to control the performance parameter by controlling one of the throttle positioning system or the fuel system.

11. The system of claim 9, further comprising a sensor disposed onboard the vehicle, the sensor operably coupled to the inducement control circuit, the inducement control circuit is structured to determine the fault condition based on the first set of sensor data from the sensor.

12. The system of claim 9, wherein the inducement control circuit comprises a download counter structured to monitor a number of times that instructions have been received from the remote computing device since the fault condition was first detected, and wherein the inducement control circuit is structured to control the vehicle performance limiter to limit the performance parameter when the number of times exceeds a threshold number of downloads.

13. The system of claim 9, wherein the second value and the first value are indicative of an output torque of at least one of the vehicle or a prime mover of the vehicle.

14. An apparatus, comprising:
an inducement control circuit comprising a memory storing machine readable instructions and a processor, the machine readable instructions structured to cause the processor to perform operations comprising:
receiving a first set of sensor data regarding a fault condition;
receiving, by the controller, location information of a vehicle;
transmitting an override request comprising the fault condition to a remote computing device, the fault condition resulting in automatically enabling a vehicle inducement that limits a performance parameter of the vehicle to a first value based on the fault condition;
receiving instructions from the remote computing device in response to the override request, the instructions comprising an inducement calibration, the inducement calibration structured to modify the vehicle inducement, the inducement calibration including a duration limit, the duration limit including a distance limit and a time limit, wherein the duration limit is based on a type of the fault condition and the distance limit is based on the location information;
receiving a second set of sensor data regarding the fault condition responsive to receiving the instructions from the remote computing system;
responsive to determining that the fault condition has been resolved based on the second set of sensor data regarding the fault condition and subsequent to receiving the inducement calibration, deactivating the vehicle inducement; and
responsive to determining that the fault condition remains present based on the second set of sensor data regarding the fault condition and subsequent to receiving the inducement calibration:
determining a second value of the performance parameter, wherein the second value of the performance parameter is greater than the first value based on a severity characteristic of the fault condition being at or below a severity threshold and based on the inducement calibration, and wherein the second value of the performance parameter is equal to the first value based on the severity characteristic of the fault condition being greater than the severity threshold such that the inducement calibration is denied;
controlling the vehicle inducement to limit the performance parameter of the vehicle to the second value based on the severity characteristic of the fault condition being at or below the severity threshold and while a distance value of the vehicle is less than the distance limit and an amount of time since receiving the inducement calibration is less than the time limit; and
subsequent to controlling the vehicle inducement based on the inducement calibration to limit the performance parameter of the vehicle to the second value controlling the vehicle inducement to limit the performance parameter of the vehicle to the first value responsive to the distance value of the vehicle being at or above the distance limit and the amount of time since receiving the inducement calibration being at or above the time limit.

15. The apparatus of claim 14, wherein the machine readable instructions cause the processor to perform further operations of determining the fault condition based on the first set of sensor data from a sensor onboard the vehicle.

16. The apparatus of claim 14, wherein the machine readable instructions further cause the processor to perform operations comprising:
updating a download counter indicative of a number of inducement calibrations received since the fault condition was first detected; and
controlling the vehicle inducement to limit the performance parameter of the vehicle to the first value based on a determination that the download counter exceeds a threshold number of downloads.

17. The apparatus of claim 14, wherein the second value and the first value are indicative of an output torque of at least one of the vehicle or a prime mover of the vehicle.

\* \* \* \* \*